United States Patent [19]

Nagano

[11] Patent Number: 4,892,005

[45] Date of Patent: Jan. 9, 1990

[54] END CAP FOR AN OUTER CABLE

[75] Inventor: Masashi Nagano, Izumi, Japan

[73] Assignee: Shimano Industrial Company Limited, Osaka, Japan

[21] Appl. No.: 187,927

[22] Filed: Apr. 29, 1988

[30] Foreign Application Priority Data

May 2, 1987 [JP] Japan .............................. 62-67325[U]

[51] Int. Cl.$^4$ .............................. F16C 1/10; F16N 7/16
[52] U.S. Cl. .................................. 74/502.4; 74/502.6; 403/51; 184/15.1
[58] Field of Search ................. 74/502.4, 502.6, 500.5, 74/501.5 R; 403/50, 51; 184/15.1; 277/152, 212 FB; 188/2 D

[56] References Cited

U.S. PATENT DOCUMENTS

| | | | |
|---|---|---|---|
| 2,517,705 | 8/1950 | Paquin | 74/502.4 X |
| 2,732,861 | 1/1956 | Gilmore | 74/502.4 X |
| 3,276,584 | 10/1966 | Mathewson | 277/152 X |
| 3,957,138 | 5/1976 | Kine | 188/2 D X |
| 4,066,147 | 1/1978 | Toyomoto | 184/15.1 |
| 4,304,149 | 12/1981 | Heimann | 74/502.4 |
| 4,321,840 | 3/1982 | Kalamon | 74/502.4 X |
| 4,534,239 | 8/1985 | Heimann | 74/502.4 |
| 4,621,937 | 11/1986 | Maccuaig | 74/502.4 X |
| 4,800,773 | 1/1989 | Nakamura et al. | 74/500.5 |

FOREIGN PATENT DOCUMENTS

| | | | |
|---|---|---|---|
| 55-23211 | 6/1980 | Japan | 74/502.4 |
| 0053206 | 11/1985 | Japan | 74/502.4 |
| 0037508 | 2/1987 | Japan | 74/502.4 |
| 369322 | 6/1963 | Switzerland | 74/502 |

Primary Examiner—Vinh T. Luong
Attorney, Agent, or Firm—Stevens, Davis, Miller & Mosher

[57] ABSTRACT

An end cap is provided for an outer cable guiding a control wire at a bicycle. The end cap has a chamber formed between the bottom wall of a cap body and a holder for holding the outer cable to be fitted into the cap body. A sealing member is disposed in the chamber, thereby preventing mud attached to the other surface of the control wire from entering into the outer cable.

4 Claims, 3 Drawing Sheets

END CAP FOR AN OUTER CABLE

FIELD OF THE INVENTION

The present invention relates to an end cap primarily used for an outer cable guiding a control wire for operating a brake or a derailleur of a bicycle.

BACKGROUND OF THE INVENTION

Conventionally, an outer cable for guiding a control wire of a bicycle has at one end an end cap attached thereto and is supported therethrough to an outer cable holder provided at an operating lever, a brake or a derailleur. The end cap used for the outer cable, as disclosed in FIG.4 of Japanese Utility Model Publication Gazette No. Sho 55-23,211, is tubular and has at its bottom an insertion bore for the control wire. Since an inner diameter of the insertion bore is larger than an outer diameter of the control wire, a gap is created between the insertion bore and the control wire. Accordingly, while the bicycle is running, mud or the like spattered from the bicycle wheel and attached to the surface of the control wire exposed from the outer cable may enter into the outer cable through the gap when the control wire moves relative to the outer cable, with the result that resistance against movement of the control wire relative to the outer cable is increased. Hence, a problem is created in that the operability of the control wire becomes worse and the outer cable and control wire are damaged, become rusted or deteriorated in durability.

SUMMARY OF THE INVENTION

An object of the invention is to provide an end cap which uses a sealing member to prevent mud or the like from entering into an outer cable and also to protect the sealing member from being damaged due to a load acting on the outer cable.

The end cap of the invention is preferably used for an outer cable guiding a control wire of a bicycle. The end cap includes a tubular cap body provided with a bottom having an insertion bore for the control wire so that the outer cable can be fitted into the end cap; a holding means for holding one end of the outer cable fitted into the cap body so as to form a chamber between the end face of the outer cable and the inner surface of the bottom of the cap body; and a sealing member disposed in the chamber and having a sealing portion surrounding the outer periphery of the control wire.

Thus, the end cap of the invention can seal the gap between the cap body and the control wire by the sealing member, thereby preventing mud or the like attached to the outer periphery of the control wire from entering into the outer cable when the control wire moves relative thereto. Moreover, the chamber housing therein the sealing member can be maintained by the holding means for the other cable, thereby enabling the sealing member to be protected from damage due to a load acting on the outer cable.

The sealing member of the invention according to one embodiment thereof is provided with an annular portion and a lip which extends radially inwardly from the inner periphery of the annular portion and forms at the center an insertion bore for the control wire. The chamber houses therein a plurality of sealing members. The sealing members comprise a tubular member having a pair of end members and are made hollow. The end members are provided with insertion bores for the control wire respectively. The sealing members are composed of porous elastic material permitting the control wire to be inserted therethrough. The sealing members can comprise a combination of a large number of cloths including woven cloth or unwoven cloth having the insertion bores surrounding the outer periphery of the control wire.

Also, preferably the sealing members are provided with a oil sump which is filled or impregnated with lubricating oil, such as grease.

In any case, mud, even when attached to the surface of the control wire, can be prevented from entering into the outer cable. As a result, the control wire is smoothly movable relative to the outer cable and avoids damage due to mud, thereby improving durability.

Also, since the cap body is provided with the holding means for holding the end of the outer cable to ensure provision of an open space in the chamber, the sealing member is not affected by a load acting on the outer cable, and is thus protected from damage.

The above and further objects and novel features of the invention will be more fully apparent from the following detailed description when the same is read in connection with the accompanying drawings.

DETAILED DESCRIPTION OF THE PREFERRED EMBODIMENTS

Figure 1:
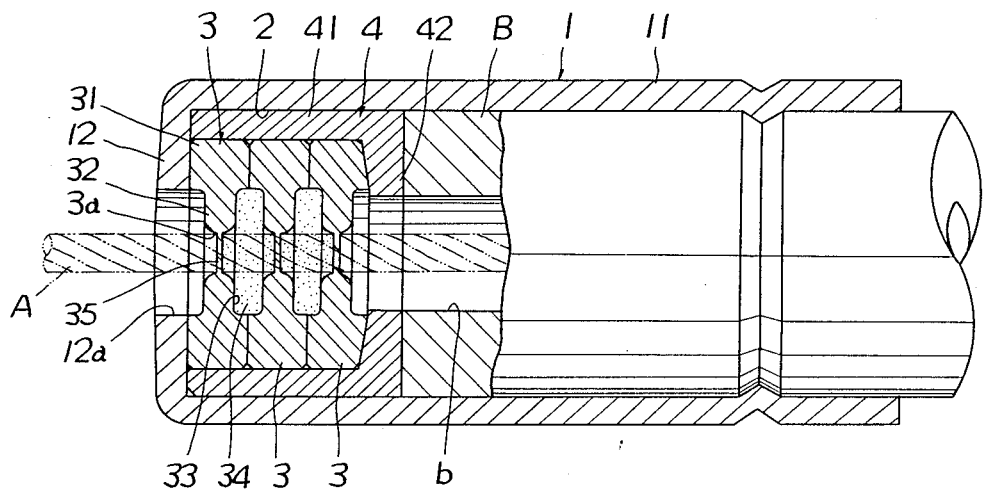
FIG.1 is a longitudinal sectional view of a first embodiment of an end cap of the invention, showing the condition in which the end cap is mounted on an outer cable.

In the first embodiment shown in FIG.1, a cap body 1 comprises (1) a tubular portion 11 fitted onto an end of a sheath-like outer cable B having a guide bore b for guiding a control wire A and (2) a bottom 12 having an insertion bore 12a for inserting therein control wire A. Between the inner surface of bottom 12 at cap body 1 and the end face of outer cable B fitted into tubular portion 11 is provided a chamber 2 in which sealing members 3 to be discussed in detail below are housed. Sealing members 3 each have an insertion bore 3a through which control wire A is inserted and a sealing portion surrounding the outer periphery of control wire A, all of which are disposed in chamber 2. Cap body 1 is provided with holding means which holds the end face of outer cable B in position and thus ensures the provision of an open space in chamber 2.

Also, sealing member 3 comprises an annular portion 31 and an annular lip 32 extending radially inwardly from a widthwise intermediate portion of the inner periphery of annular portion 31 and having at its center an insertion bore 3a. A plurality of sealing members 3 are housed in layers within chamber 2. Each lip 32 is recessed at both of its side surfaces with respect to both side surfaces of annular portion 31 so that oil sumps 33 are formed between the plurality of sealing members 3 in chamber 2. Oil sumps 33 are filled with a lubricant 34, such as durable grease. In addition, each insertion bore 3a is somewhat similar in diameter than control wire A.

Figure 7:
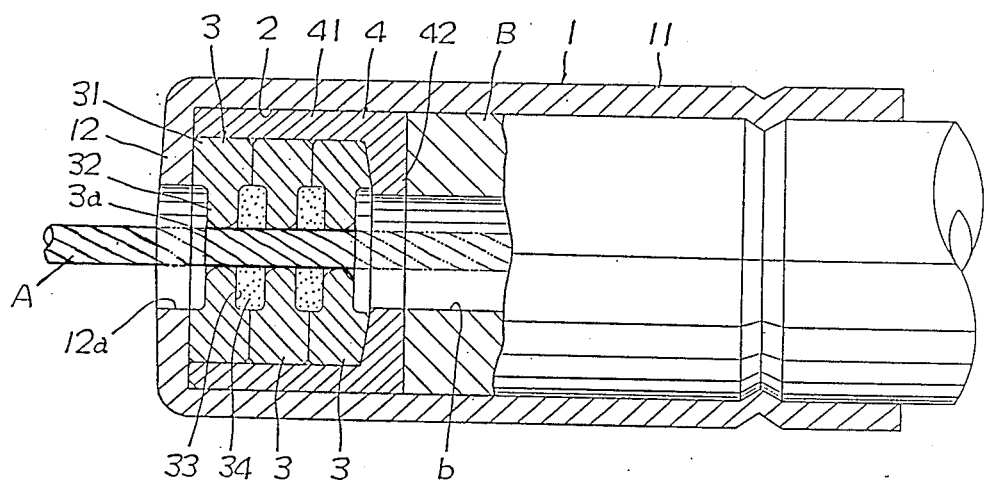
FIG. 7 shows the insertion bore in the annular lip portions of FIG. 1 formed after the control wire has penetrated through the thin film.

Each sealing member 3 is molded preferably of flexible material, such as synthetic resin or rubber. Preferably, when sealing member 3 is molded, lip 32 is provided with a thin film 35 closing insertion bore 3a (see FIG. 7) and the lubricant is filled between each lip 32 and each film 35 so that control wire A, when inserted into outer cable B, breaks film 35 by the end edge of control wire A. FIG. 7 shows insertion bore 3a after wire A has penetrated thin film 35.

Holding means 4 is formed of a tubular leg 41 fitted into chamber 2 and a holding portion 42 extending toward the center from one axial end of leg 41 and abutting against the end face of outer cable B. Leg 41 abuts at its fore end against bottom 12 of cap body 1, so that a lengthwise load applied one-sidedly to outer cable B acts on bottom 12 through the holding portion 42 and leg 41, and holding means 4 keeps chamber 2 constant in size so as not to be affected by the load.

The end cap constructed as described above has a plurality of sealing members 3 inserted in layers in leg 41 and a lubricant is filled between respective lips 32 of sealing members 3.

Fitting tubular portion 11 of cap body 1 is fitted onto the outer periphery of one end of outer cable B, and the end face thereof abuts against holding portion 42. At another axial position tubular portion 11 is contracted in part to enable it to be fixed to outer cable B.

When control wire A is moved relative to outer cable B, lip 32 scrapes off mud from control wire A, thereby preventing the mud from entering into guide bore b of outer cable B. Also, the lubricant filled between respective lips 32 can lubricate the surface of control wire A, thereby reducing a contact resistance between control wire A and sealing members 3 and especially increasing the durability of sealing members 3.

Figure 2:
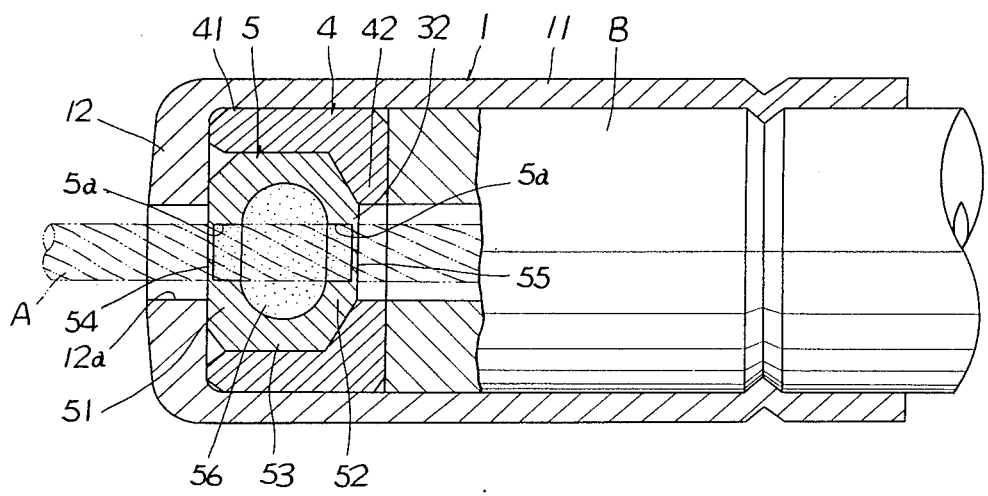
FIGS.2 and 3 are longitudinal sectional views of second and third embodiments of the invention, corresponding to FIG.1.

Alternatively, as shown in a second embodiment in FIG.2, a sealing member 5 may comprise a pair of end members 51 and 52 and a hollow tubular member 53, and insertion bores 5a for control wire A may be formed at end members 51 and 52 respectively.

Also, in this embodiment, preferably end members 51 and 52 are provided with breakable thin films 54 and 55 to close insertion bores 5a and a lubricant is filled in tubular member 53.

Figure 3:
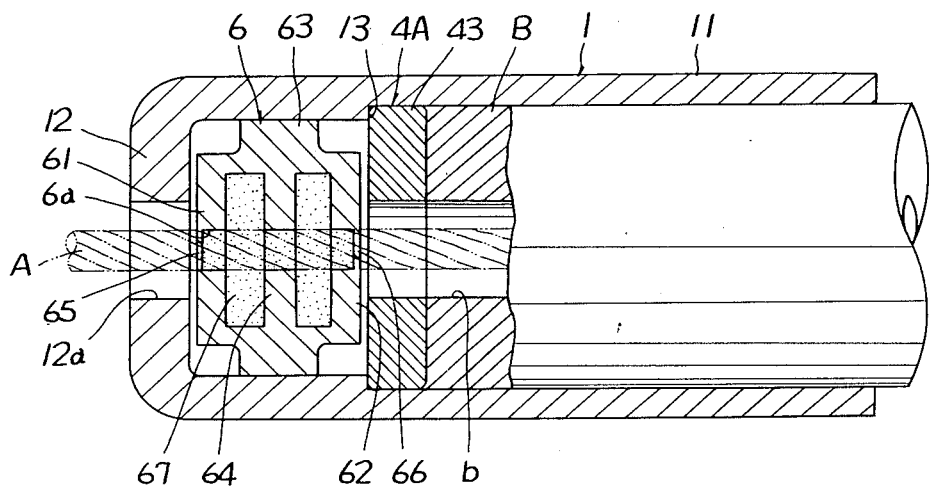

Alternatively, as shown in a third embodiment of the invention in FIG.3, a sealing member 6 may comprise a pair of end members 61 and 62 and a hollow tubular member 63, and insertion bores 6a for control wire A may be formed at end members 61 and 62. Also, tubular member 63 may be provided therein with at least one partition 64 having an insertion bore 6a.

Also, in the third embodiment, preferably end members 61 and 62 are provided with breakable thin films 65 and 66 to close insertion bores 6a and a lubricant 67 is filled in tubular member 63.

Figure 4:
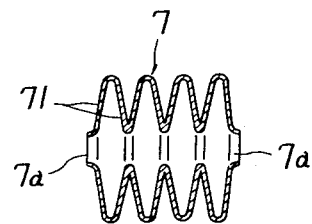
FIGS. 4,5 and 6 are sectional views illustrating alternative sealing members.

Alternatively, as shown in FIG.4, a sealing member 7 may be formed of an elastic bellows member comprising vertically jagged walls and having at both axial ends insertion bores 7a for control wire A.

Figure 5:

Furthermore, as shown in FIG.5, a sealing member 8 may alternatively be formed of solid porous elastic material, such as sponge material, so that control wire A, when inserted into outer cable B, may bore through the elastic member to form the insertion bore (not shown).

Figure 6:
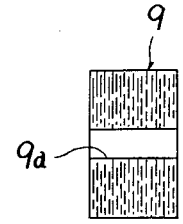

Also, as shown in FIG.6, a sealing member 9 may alternativly be formed of unwoven cloth, such as felt, or other cloth material, having an insertion bore 9a.

Additionally, as shown in FIG.3, cap body 1 may be larger in thickness at part of the wall forming chamber 2 so as to form a shoulder 13 through which a plate-like holder 43 may be supported, thereby constituting a holding means 4A.

Also, holder 43 may be of rigid material, but preferably a dish-like leaf spring is used so that, when outer cable B is inserted into the end cap, holder 43 is deflected by the outer cable abutting thereagainst to press the sealing member onto bottom 12 to be locked thereby.

Although several embodiments have been described, they are merely illustrative of the invention and not to be construed as limiting, the invention being defined solely by the appended claims.

What is claimed is:

1. An end cap adapted to be used on an outer cable guiding a control wire of a bicycle, said end cap comprising:
    a tubular cap body provided with a bottom portion having an insertion bore adapted to receive the control wire so as to enable the outer cable to be inserted into said cap body;
    a holding means adapted to hold an end face of the outer cable at a given position when the outer cable is fitted into said cap body to form a chamber having an open space between the end face of the outer cable and an inner surface of said bottom portion; and
    a plurality of sealing members disposed in said chamber and having a sealing portion adapted to surround and seal an outer periphery of the control wire, wherein each of said sealing members is provided with an annular portion and a lip portion extending radially inwardly from an inner periphery of said annular portion and having a center portion adapted to have the control wire inserted therethrough.

2. An end cap according to claim 1, wherein said center portion of each of said sealing members comprises a thin film breakable by insertion of the control wire therethrough to form an insertion bore adapted to have the control wire inserted therethrough.

3. An end cap according to claim 1, further comprising an oil sump means formed between said plurality of sealing members housed in said chamber, said oil sump means comprising a recess provided at said lip portion of each of said sealing members, said recess being positioned at a side surface of said annular portion, said oil sump means being filled with lubricating oil for lubricating the control wire.

4. An end cap according to claim 1, wherein said holding means is provided with a leg abutting against said inner surface of said bottom portion of said cap body and a holding portion having a holding surface adapted to abut against the end face of the outer cable.

* * * * *